United States Patent [19]

Kawai et al.

[11] Patent Number: 5,279,886
[45] Date of Patent: Jan. 18, 1994

[54] ALUMINA SINTERED BODY

[75] Inventors: Takeshi Kawai, Komaki; Nobuhiro Hayakawa, Chita; Harumi Aiba, Komaki, all of Japan

[73] Assignee: NGK Spark Plug Co., Ltd., Aichi, Japan

[21] Appl. No.: 645,870

[22] Filed: Jan. 25, 1991

[30] Foreign Application Priority Data

Jan. 25, 1990 [JP] Japan .................... 2-15850

[51] Int. Cl.$^5$ .................................. C01F 17/00
[52] U.S. Cl. ................... 428/209; 219/553; 156/89; 264/61; 264/63; 428/210; 428/472; 428/697; 428/699; 428/701; 428/702; 428/901; 501/105; 501/152
[58] Field of Search ........... 501/105, 152; 428/472, 428/623, 633, 652, 699, 689, 697, 702, 901, 697, 701, 210, 209; 219/553; 156/89; 264/61, 63

[56] References Cited

U.S. PATENT DOCUMENTS

| | | | |
|---|---|---|---|
| 4,199,423 | 4/1980 | Mann | 204/429 |
| 4,316,964 | 2/1982 | Lange | 501/105 |
| 4,449,039 | 5/1984 | Fukazawa et al. | 219/553 |
| 4,500,412 | 2/1985 | Takahashi et al. | 204/425 |
| 4,532,224 | 7/1985 | Hori | 501/105 |
| 4,751,207 | 6/1988 | Manniing | 501/105 |
| 4,760,038 | 7/1988 | Kinney, Jr. et al. | 501/105 |
| 4,772,576 | 9/1988 | Kimura et al. | 501/105 |
| 4,814,304 | 3/1989 | Takeuchi et al. | 428/901 |
| 5,057,360 | 10/1991 | Osaka et al. | 428/901 |

OTHER PUBLICATIONS

"Mechanical Properties of Mullite-SiC Whisker Composites", 97(9), pp. 895-902, 1989.
"Grindability of $Al_2O_3$-$ZrO_2$ Composite Ceramics," 97(9), pp. 929-934, 1989.
"Effect of Microstructure on Cyclic Fatigue Properties of $Al_2O_3$ Ceramics and $Al_2O_3$ Composites", 98(5), pp. 456-463, 1990.

*Primary Examiner*—A. A. Turner
*Attorney, Agent, or Firm*—Sughrue, Mion, Zinn, Macpeak & Seas

[57] ABSTRACT

The present invention provides an improved alumina sintered body on which a heater electrode is printed and which is sintered simultaneously with the heater electrode at temperatures lower than the optimum value 1,520° C. The alumina sintered body includes high purity of alumina and 2 through 18% by weight partially stabilized zirconia, which further contains 2 through 6 mole percent solid solution of an oxide or oxides selected from $Y_2O_3$, $Sc_2O_3$, and lanthanum series metal oxides. The high purity of alumina may contain 0.1% by weight alkaline metals and/or alkaline earth metals and 1.0% by weight $SiO_2$ at most. In the alumina sintered body of the invention, segregation and migration of impurities and chipping are effectively prevented and hence the durability of the sintered body is highly improved. Use of the alumina sintered body of the invention as a heater base makes the durability of a heater much longer.

8 Claims, 8 Drawing Sheets

REFLECTED ELECTRON RAYS

BEFORE TEST

AFTER 6.5 HOUR - DURABILITY TEST

Na$^+$

BEFORE TEST $Ca^{2+}$

AFTER 6.5 HOUR – DURABILITY TEST $Si^{4+}$

BEFORE TEST

REFLECTED ELECTRON RAYS

AFTER 130 HOUR–
DURABILITY TEST $Zr^{4+}$ $Y^{3+}$

FIG. 6A
SEM (X1,500)
FIG. 6B
XMA ($Si^{4+}$)
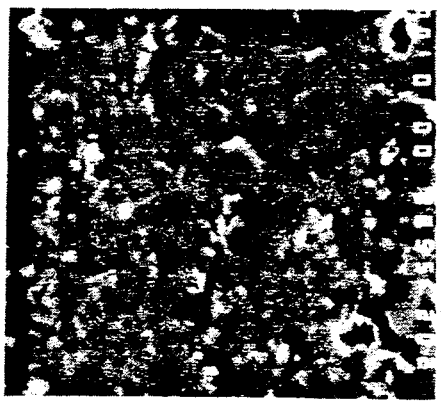
POINT A (NEAR CHIPPING)
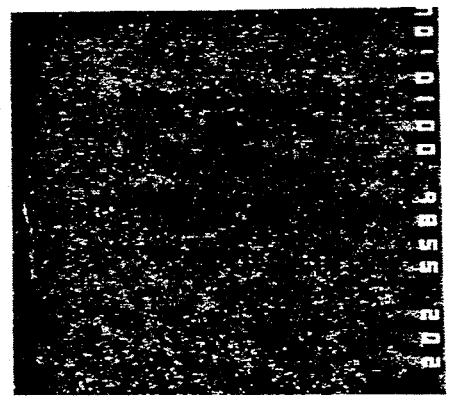
FIG. 6C
FIG. 6D
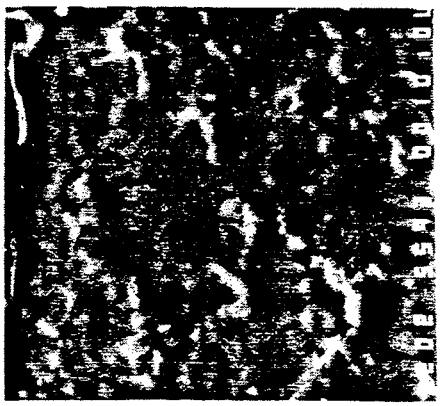
POINT B (SURFACE WITH NO CHIPPING)
FIG. 6E
FIG. 6F
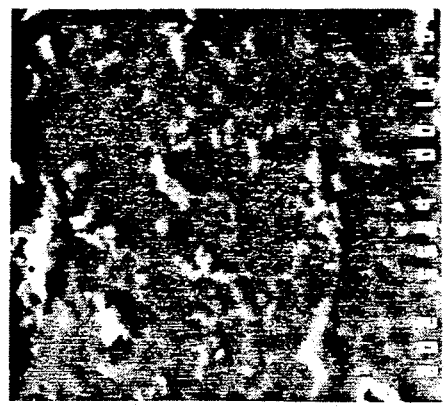
POINT C (DEPTHS WITH NO CHIPPING)
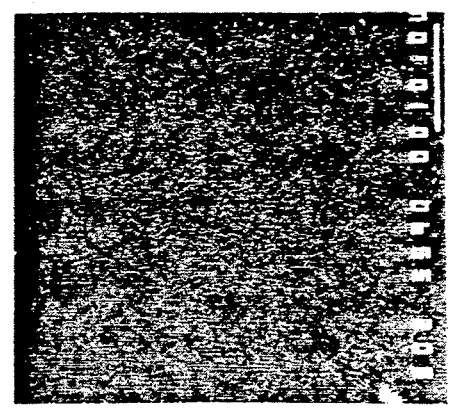

ALUMINA SINTERED BODY

BACKGROUND OF THE INVENTION

The present invention relates to an alumina sintered body on which a heater electrode is printed so as to form a ceramic heater or sensor element heater.

An alumina sintered body generally contains low-sodium aluminate as a main material and a sintering assistant or grain growth-inhibitor for lowering the sintering temperature. Exemplary sintering assistants include $Na_2O_{SiO_2}$-MgO glass components and oxides which easily form vitreous structures when being sintered such as MgO, CaO, $K_2O$, and $B_2O_3$. When the oxide or oxides are added to low-sodium aluminate, vitreous structures with a low melting point are formed in the alumina sintered body, which results in lowering the sintering temperature.

Addition of an IIIa metal oxide such as $Y_2O_3$ to low-sodium aluminate also lowers the sintering temperature of the alumina sintered body, and addition of MgO or $ZrO_2$ inhibits grain growth in the alumina sintered body. An oxide or oxides like $Y_2O_3$, MgO, and $ZrO_2$ may thus be added to low-sodium aluminate so as to sufficiently lower the sintering temperature.

Some problems arise when an alumina sintered body containing low-sodium aluminate and the above oxide or oxides is used as a heater base, however. When a heater including an alumina sintered body as a heater base is used at a high temperature and a high voltage of direct current, alkaline metals and alkaline earth metals existing in the alumina as impurities migrate to the negative terminal side and are segregated as compounds with low melting points, which results in lifting of the surface of the heater base. This can cause cracks on the heater base or breaking of heater wires.

More specifically, in a heater including a heater base of an alumina sintered body containing $SiO_2$, the following are observed: destruction of a grain boundary in the heater base due to sublimation of $SiO_2$, occurrence of chipping on the heater base, and lowering of strength of the heater base as $SiO_2$ forms vitreous structures with a low melting point when the heater is used at a high temperature. One of the primary reasons for these phenomena is that $SiO_2$ and $Al_2O_3$ combine to form mullite, which decomposes, melts, and separates into two phases, i.e., a silica phase and an alumina phase at high temperatures.

Migration of alkaline metals and alkaline earth metals may be prevented by using high purity $Al_2O_3$ for the heater base. Use of high purity of $Al_2O_3$, however, raises the sintering temperature to approximately 1,560° C. When sintering is executed at such high temperatures, grain growth takes place in a heater electrode including Pt, or only a relatively rough sintered body is obtained, which results in shortening the durability of the heater. Thus, use of high purity alumina is not a fundamental solution since it raises the sintering temperature to be much higher than the optimum sintering temperature, i.e., 1,520° C. The optimum sintering temperature, 1,520° C., is determined by considering the fact that grain growth of Pt or other elements takes place in the heater electrode at a temperature higher than 1,550° C.

Wherefore, the object of the invention is thus to provide an alumina sintered body which has long durability and is sintered at 1,520° C. or a lower temperature.

Other objects and benefits of the invention will become apparent from the detailed description which follows hereinafter when taken in conjunction with the drawing figures which accompany it.

SUMMARY

The above and other related objectives are realized by an alumina sintered body on which a heater electrode is printed and which is sittered simultaneously with the heater electrode. The alumina sintered body includes high purity alumina and 2 through 18% by weight partially stabilized zirconia, said zirconia further containing 2 through 6 mole percent solid solution of an oxide or oxides selected from $Y_2O_3$, $Sc_2O_3$, and lanthanum series metal oxides. The high purity alumina may contain 0.1% by weight alkaline metals and/or alkaline earth metals and 1.0% by weight $SiO_2$ at most.

The alumina sintered body of the invention includes partially stabilized zirconia containing 2 through 6 mole percent of an oxide or oxides selected from $Y_2O_3$, $Sc_2O_3$, and lanthanum series metal oxides as an assistant for sintering alumina. Use of the zirconia effectively lowers the sintering temperature and prevents migration of alkaline metals and alkaline earth metals. The preferable zirconia is partially stabilized zirconia containing an oxide or oxides such as $Y_2O_3$ co-precipitated therewith.

The quantity of the partially stabilized zirconia is within a range of 2 to 18% by weight. When it is less than 2% by weight or greater than 18% by weight, the sintering temperature is not sufficiently lowered. The quantity of the solid solution of an oxide or oxides such as $Y_2O_3$ contained in the partially stabliized zirconiua is within a range of 2 to 6 mole percent. When it is less than 2 mole percent or greater than 6 mole percent, the sintering temperature is not sufficiently lowered.

Alumina, or the primary material of the alumina sintered body, may contain at most 0.1% by weight alkaline metals and/or alkaline earth metals and 1.0% by weight $SiO_2$ as impurities. When it contains higher concentration of the impurities, chipping may occur on the alumina sintered body and durability of the sintered body may be shortened.

DESCRIPTION OF THE DRAWINGS

The invention may be best understood by referring to the following detailed description of a preferred embodiment and the accompanying drawings, wherein like numerals denote like elements and in which:

FIG. 6A-F is explanatory views showing SEM (scanning electron microscope) images and XMA (X-ray microanalyzer) diffraction patterns of a conventional heater on which chipping is observed;

DESCRIPTION OF THE PREFERRED EMBODIMENT

A preferred embodiment of the invention will now be explained in detail with reference to the drawings. Since there may be many modifications without departing from the scope of the invention, the embodiment below is not intended to limit the invention to the single disclosed embodiment; but, is intended to illustrate the invention more clearly. It is intended that the breadth to be accorded the appended claims be in accordance with the scope and spirit of the invention as disclosed herein.

An alumina sintered body of the embodiment is used as a base of a heater element for an oxygen sensor. A heater element including the alumina sintered body of the embodiment (hereinafter referred to as the heater of the embodiment) and a conventional heater element (hereinafter referred to as the conventional heater) including a base containing low-sodium aluminate and $Na_2O\text{-}SiO_2\text{-}MgO$ glass component as a sintering assistant are compared with each other. Each heater is manufactured as follows.

HEATER OF THE EMBODIMENT

2% by weight partially stabilized zirconia (hereinafter referred to as PSZ) containing 5.5 mole percent $Y_2O_3$ and PVB binder are added to high purity alumina. Here the PSZ acts as an assistant for efficiently sintering the alumina. The high purity alumina contains 10 ppm or less alkaline metals and/or alkaline earth metals, approximately 14 ppm $SiO_2$, and approximately 3 ppm MgO as impurities ($Al_2O_3$ purity: 99.99%; average grain diameter: 0.4 μm; and the specific surface area: 7.0 m²/g). The mixture is molded to form a green sheet 1 of 4.5 mm×57 mm ×0.45 mm by the well-known doctor blade method.

Figure 1:
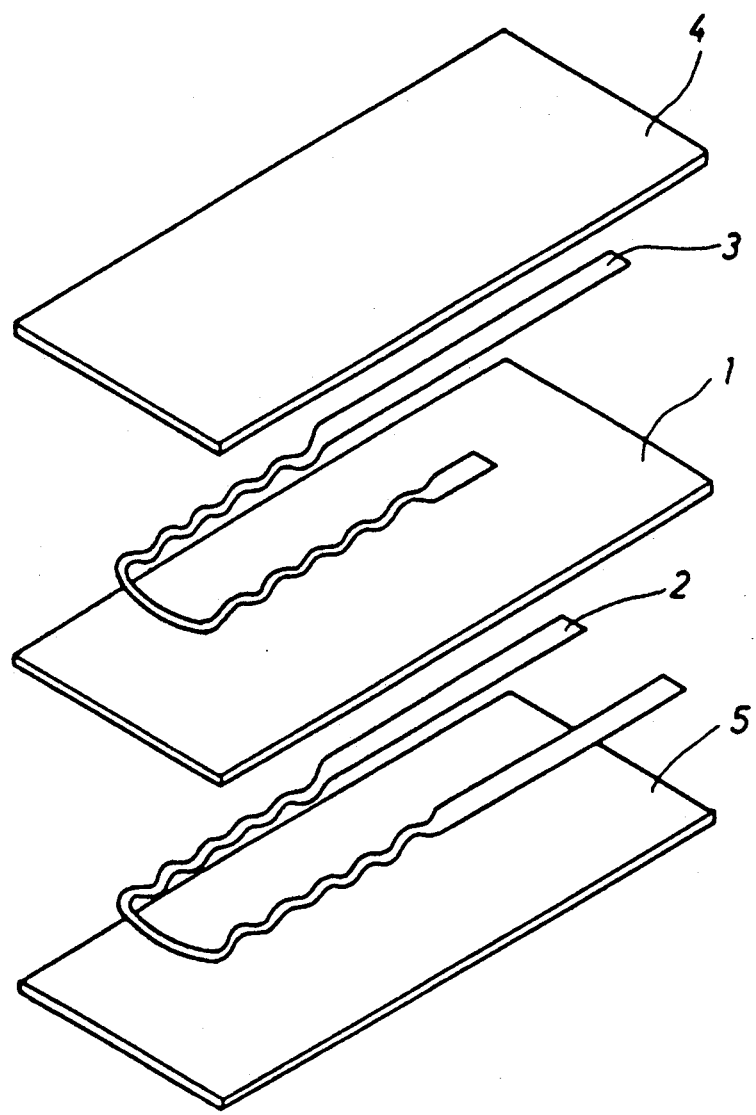
FIG. 1 is a perspective view illustrating decomposition of a heater including an alumina sintered body according to the invention.

As shown in FIG. 1, a heater electrode 2 mainly made of platinum is screen printed onto the lower face of the green sheet or heater base 1, and a migration preventing pattern 3 mainly composed of platinum is screen printed onto the upper face of the heater base 1. Green sheets of laminates 4 and 5 of 4.5 mm×57 mm×0.27 mm are laminated, respectively, onto the upper and lower faces of the heater base 1 across the migration preventing pattern 3 and the heater electrode 2. The green sheets of laminates 4 and 5 have the same composition as the green sheet 1 and are also molded by the doctor blade method.

The heater element thus laminated is sintered at a temperature lower than 1,520° C. in a high temperature sintering furnace to form a heater of the embodiment.

CONVENTIONAL HEATER

Low-sodium aluminate and $Na_2O\text{-}SiO_2\text{-}MgO$ glass component as a sintering assistant are used, respectively, instead of high purity alumina and PSZ as used in the heater of the embodiment, to form a green sheet. A conventional heater is then manufactured in the same manner as the heater of the embodiment.

Figure 2:
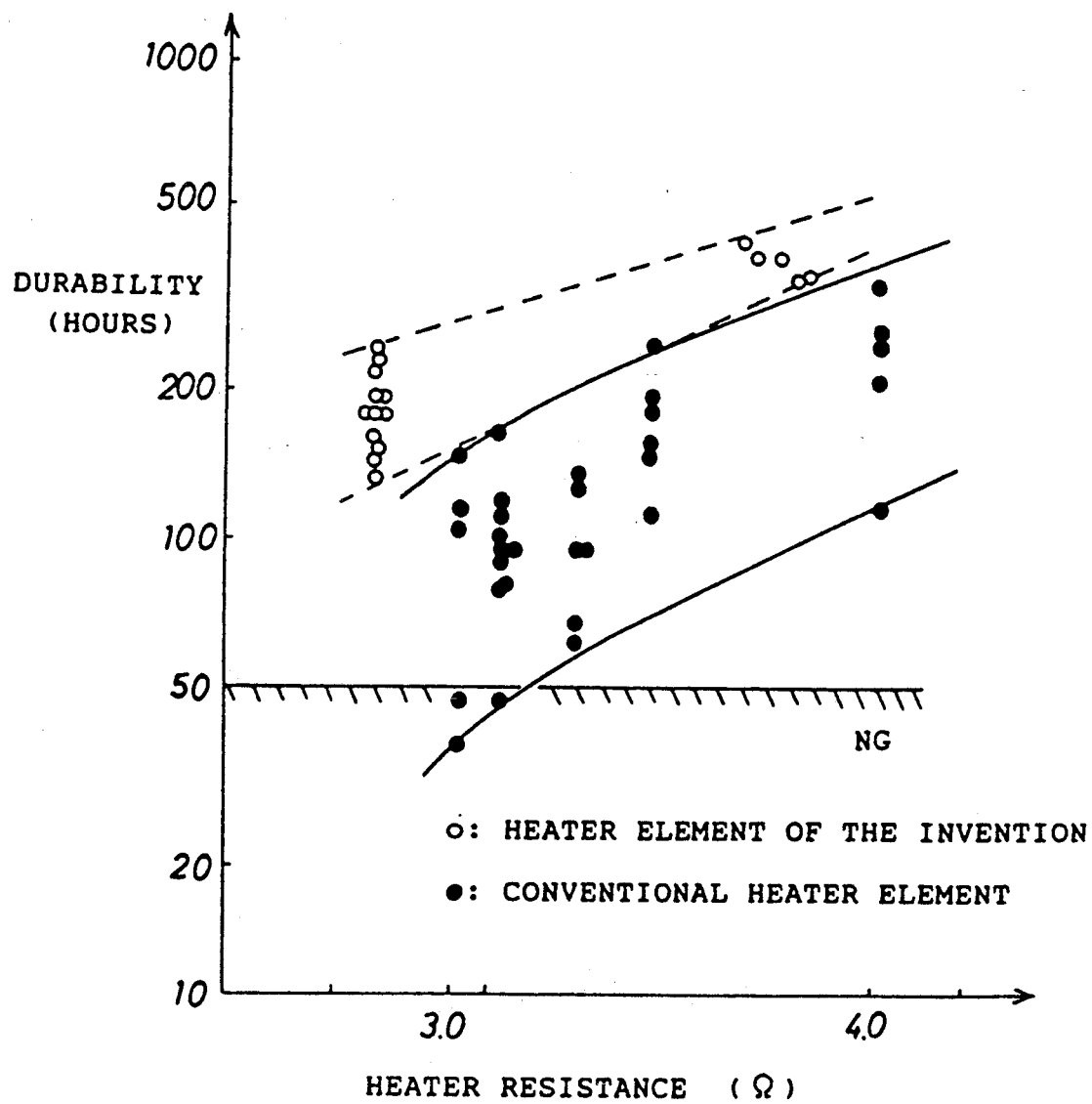
FIG. 2 is a graph showing the relationship between the heater resistance and the durability for comparing heaters manufactured according to the invention with conventional heaters.

Heaters of the embodiment and conventional heaters each having a heater resistance of between 2 and 4Ω at room temperature (unless otherwise specified, heater resistance hereinafter is measured at room temperature) were sintered in the above manner. A voltage of 13V was applied to each heater in an atmosphere of 1,000° C. for measuring durability of each heater (acceleration durability test). FIG. 2 shows the results of the test.

As clearly seen in FIG. 2, the heaters of the embodiment showed superior durability through the whole range of practical heater resistances, i.e., 2 through 4Ω. While durability of each conventional heater with a low heater resistance was less than 50 hours, that of the tested embodiment of this invention was more than 100 hours.

Figure 3:
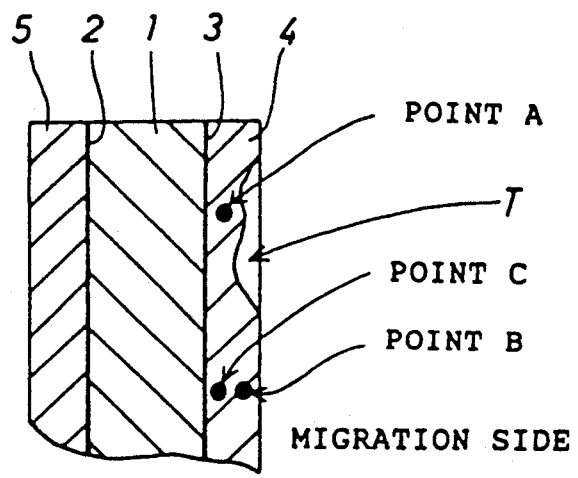
FIG. 3 is a cross sectional view of a heater element on which chipping is observed.
Figure 4A:
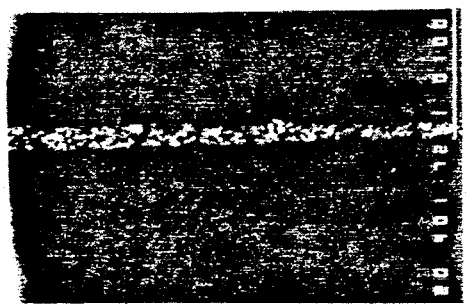
FIG. 4A-H is photographs showing X-ray diffraction patterns in the vicinity of a heater electrode of a conventional heater.
Figure 4B:
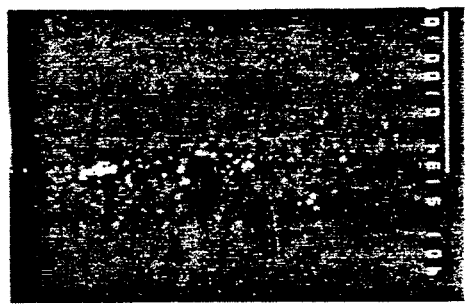
Figure 4C:
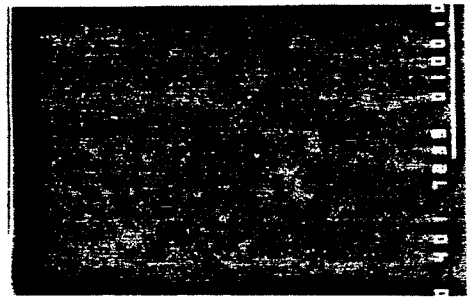
Figure 4D:
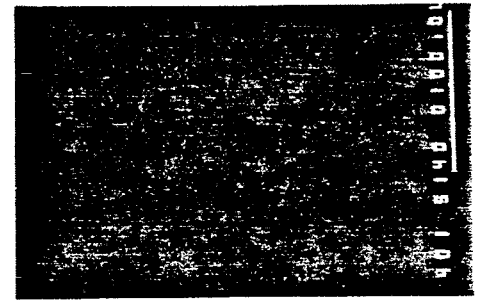
Figure 4E:
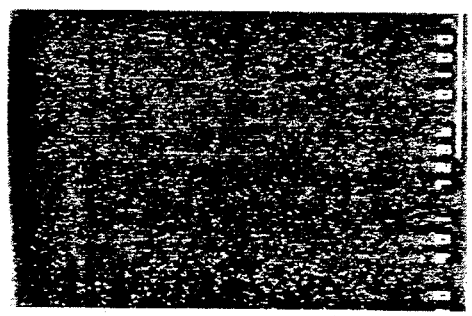
Figure 4F:
Figure 4G:
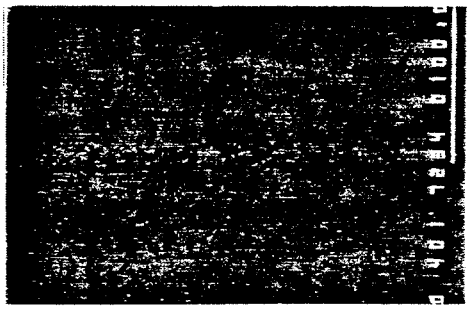
Figure 4H:
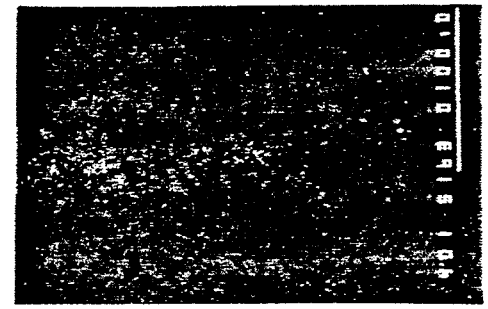
Figure 5A:
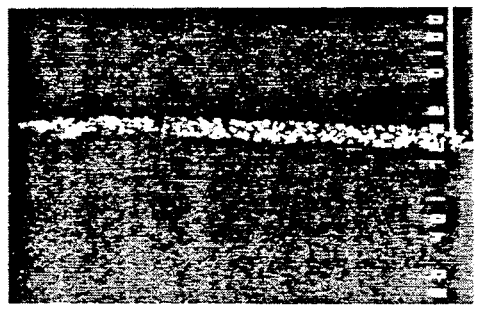
FIG. 5A-F is photographs showing X-ray diffraction patterns in the vicinity of a heater electrode of a heater manufactured according to the invention.
Figure 5B:
Figure 5C:
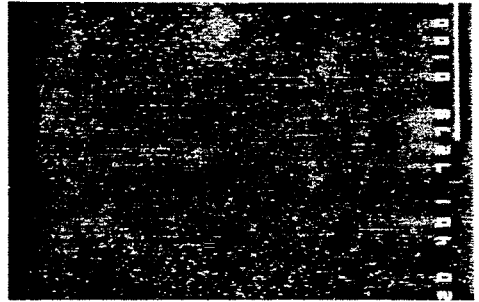
Figure 5D:
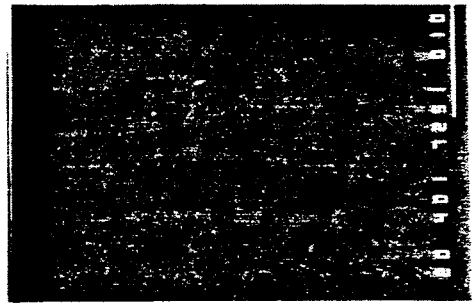
Figure 5E:
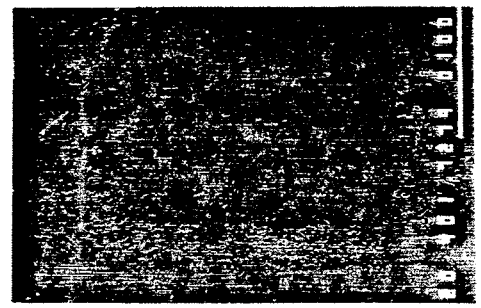
Figure 5F:
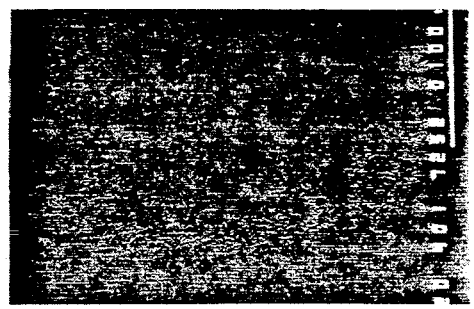

A chipping T was observed on the green sheet of laminate 4 mounted across the migration preventing pattern 3 on the heater base 1 in some of the conventional heaters as shown in FIG. 3, while no chipping was observed in any heater of the embodiment.

Migration and segregation of the impurities in alumina near the heater electrode 2 were observed as to both the heater of the embodiment and the conventional heater. For this analysis, an X-ray microanalyzer (hereinafter referred to as XMA) was used. Characteristic X-rays emitted from an object (heater), which was irradiated with electron rays, were photographed and analyzed on the wave length or other properties thereof with an X-ray spectroscope.

X-ray diffraction patterns of the conventional heater were taken with the XMA, before the acceleration durability test and after the 6.5 hour-durability test while those of the heater of the embodiment were taken before the test and after the 130 hour-durability test. FIG. 4 and FIG. 5 show the results of the analysis for the conventional heater and the heater of the embodiment, respectively.

As shown in FIG. 4, in the conventional heater, the glass component and Si, Ca, and Na existing in low-sodium aluminate as impurities were segregated after only the durability test of 6.5 hours. The images of the reflected electron rays clearly showed deformation of the structure near the heater electrode and migration on the heater electrode.

On the other hand, as shown in FIG. 5, in the heater of the embodiment, neither the alkaline metals and alkaline earth metals existing as impurities nor the components (Y and Zr) of PSZ added as a sintering assistant were segregated. As seen in the images of the reflected electron rays, diffraction patterns of the heater electrode after the durability test for 130 hours were substantially the same as those before the test, and no migration was observed on the heater electrode.

Since no segregation nor migration of impurities occurs on the alumina sintered body of the embodiment, use of the alumina sintered body of the embodiment as a heater base improves the durability of a heater element. In the conventional heater on which chipping was observed, distribution of $SiO_2$ in the direction of depth was measured with the XMA and a scanning electron microscope (hereinafter referred to as SEM). The measurement was conducted at a point A near the chipping, a point B on the surface of the base with no chipping, and a point C in the depths of the base with no chipping as shown in FIG. 3.

FIG. 6 shows the results of the measurement, i.e., SEM images and XMA diffraction patterns. The diffraction pattern of the chipping surface shows formation of a grain boundary of $SiO_2$. $SiO_2$ was determined at points A, B and C, and Table 1 shows the results of the determination. Though decrease of the amount of $SiO_2$ was observed at all the points, the decrease rate of the amount was especially high at the point A of the chipping surface.

TABLE 1

|  | point A | point B | point C |
|---|---|---|---|
| $SiO_2$ (% by weight) | 1.09 | 1.75 | 2.40 |

The above results for the conventional heater well explain the cause of chipping; that is, formation of a grain boundary of $SiO_2$ lowers intensity of the heater and sublimation of $SiO_2$ from the surface of the causes chipping.

In the heater of the embodiment, neither formation of a grain boundary of $SiO_2$ nor sublimation of $SiO_2$ from the surface of the heater base takes place and, therefore, no chipping occurs. Thus, the heater of the embodiment maintains sufficient intensity and a favorable appearance.

The following experiments were performed to measure the effects of additions and impurities and to determine the optimum amount of PSZ and solid solution in PSZ. In these experiments, reference heaters were used for comparison.

EXPERIMENT 1: EFFECTS OF ADDITIONS

A heater base including high purity of alumina and 2% by weight PSZ (partially stabilized zirconia containing 5.5 mole % $Y_2O_3$) as a sintering assistant was used for preparing a heater according to the invention.

A heater base including high purity of alumina and 2% by weight oxide shown in Table 2 as a sintering assistant was used for preparing each reference heater.

The minimum sintering temperature, or the temperature at which no open pores are observed, was determined for each heater, and the results are shown in Table 2.

The sintering temperature was measured in the following manner. Each sintered heater was dipped in a red check solution and washed with water. The sintering temperature at which the red check solution was swept away was determined to be the minimum sintering temperature with no open pores.

The sintering temperature of each reference heater including high purity of alumina and one of $Y_2O_3$, MgO, $SiO_2$, and $ZrO_2$ as a sintering assistant was higher than the optimum value, 1,520° C. The high temperature causes grain growth on the heater electrode and produces insufficiently dense and undurable sintered body.

In the reference heater including high purity of alumina and glass ($Na_2O$-$SiO_2$-MgO glass component) as a sintering assistant, though the sintering temperature was lower than the optimum value, 1,520° C., occurrence of cracks and breaking of wires of the heater electrode were observed after 5 to 50 hour-durability test. Namely, the produced heater did not possess sufficient durability. Here the durability test was performed in an atmosphere of 1,000° C. (heater resistance: 2.8Ω, applied voltage: 13V).

The heater using the heater base of the invention including high purity of alumina and PSZ as a sintering assistant was sufficiently sintered at a lower temperature. The lower temperature does not produce grain growth and allows a dense sintered body. Neither cracks nor breaking of wires of the heater electrode was observed even after the durability test for approximately 200 hours. Namely, use of the alumina sintered body of the invention for a heater or heater element increases the durability thereof.

TABLE 2

|  | Additions | Raw density | Sintering temperature (°C.) | Apparent specific gravity | Evaluation |
|---|---|---|---|---|---|
| This invention | PSZ[*1] | 2.52 | 1,475 | 3.95 | Preferable sintering temperature No crack occurs after 200 hours[*2] |
| References | Glass[*3] | 2.49 | 1,475 | 3.90 | Preferable sintering temperature Crack occurs after 5 to 50 hours[*2] |
|  | $Y_2O_3$ | 2.52 | 1,530 | 3.96 | High sintering temperature ($\geq$1520° C.) |
|  | MgO | 2.51 | 1,540 | 3.90 | High sintering temperature ($\geq$1520° C.) |
|  | $SiO_2$ | 2.50 | 1,550 | 3.91 | High sintering temperature ($\geq$1520° C.) |
|  | $ZrO_2$ | 2.50 | 1,540 | 3.94 | High sintering temperature ($\geq$1520° C.) |

[*1]Partly stabilized zirconia containing 5.5 mole % $Y_2O_3$
[*2]Results of the durability test (Heater resistance: 2.8 Ω, Applied voltage: 13 V, in an atmosphere of 1,000° C.)
[*3]$Na_2O$—$SiO_2$—MgO glass component

TABLE 3

|  | Metal content[*4] (% by weight) | $SiO_2$ content (% by weight) | Chiping | Durability[*5] (hours) |
|---|---|---|---|---|
| References Out of the range | 0.60 | 1.52 | Observed | 20 |
|  | 0.50 | 1.53 | Observed | 30 |
|  | 0.40 | 1.51 | Observed | 20 |
| This invention Within the range | 0.10 | 1.0 | None | 120 |
|  | 0.08 | 0.05 | None | 120 |
|  | 0.002 | 0.005 | None | 180 |

[*4]Total content of alkaline metals and alkaline earth metals
[*5]Results of the durability test (Heater resistance: 2.8 Ω, Applied voltage: 13 V, in an atmosphere of 1,000° C.)

EXPERIMENT 2: EFFECTS OF IMPURITIES IN ALUMINA

Total content of alkaline metals and alkaline earth metals and content of $SiO_2$ existing in alumina were varied while the amount of PSZ was fixed to 2% by weight. Table 3 shows the relationship among each content, occurrence of chipping on the heater element, and durability. Durability was measured in the same manner as Experiment 1.

When the total content of alkaline metals and alkaline earth metals was over 0.1% by weight and the content of $SiO_2$ was over 1.0% by weight, chipping occurred on the heater base, which results in short durability of the base. On the other hand, when the total content of alkaline metals and alkaline earth metals was 0.1% by weight or less and the content of $SiO_2$ was 1.0% by weight or less, no chipping occurred and the produced heater had sufficient durability. From these results, high purity of alumina used for preparing the heater of the invention may contain at most 0.1% by weight alkaline metals and/or alkaline earth metals and 1.0% by weight $SiO_2$ as impurities.

EXPERIMENT 3: OPTIMUM AMOUNT OF PSZ

Figure 7:
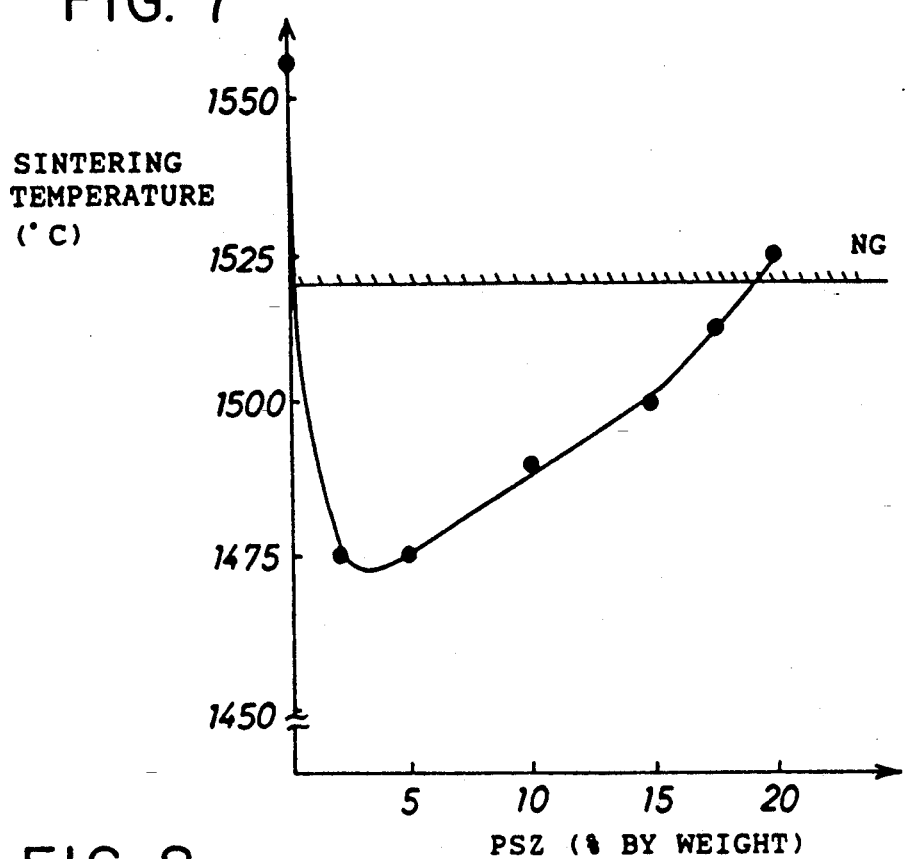
FIG. 7 is a graph showing the relationship between the sintering temperature and the content of PSZ (partially stabilized zirconia containing 5.5 mole percent $Y_2O_3$) in a heater base of a heater manufactured according to the invention; and, FIG. 8 is a graph showing the relationship between the sintering temperature and the content of $Y_2O_3$ in PSZ.

The amount of PSZ (partially stabilized zirconia containing 5.5 mole % $Y_2O_3$) in the heater base of the invention was varied. FIG. 7 shows the relationship between the PSZ and the sintering temperature.

As clearly seen in FIG. 7, when the PSZ was in a range of 2 to 18% by weight, the sintering temperature was lower than 1,520° C.; in other words, when it was out of the above range, the sintering temperature became higher than the optimum value.

The heater including the alumina sintered body containing the above range of PSZ showed two or three times as long durability as the conventional heaters.

EXPERIMENT 4: OPTIMUM AMOUNT OF SOLID SOLUTION IN PSZ

Figure 8:
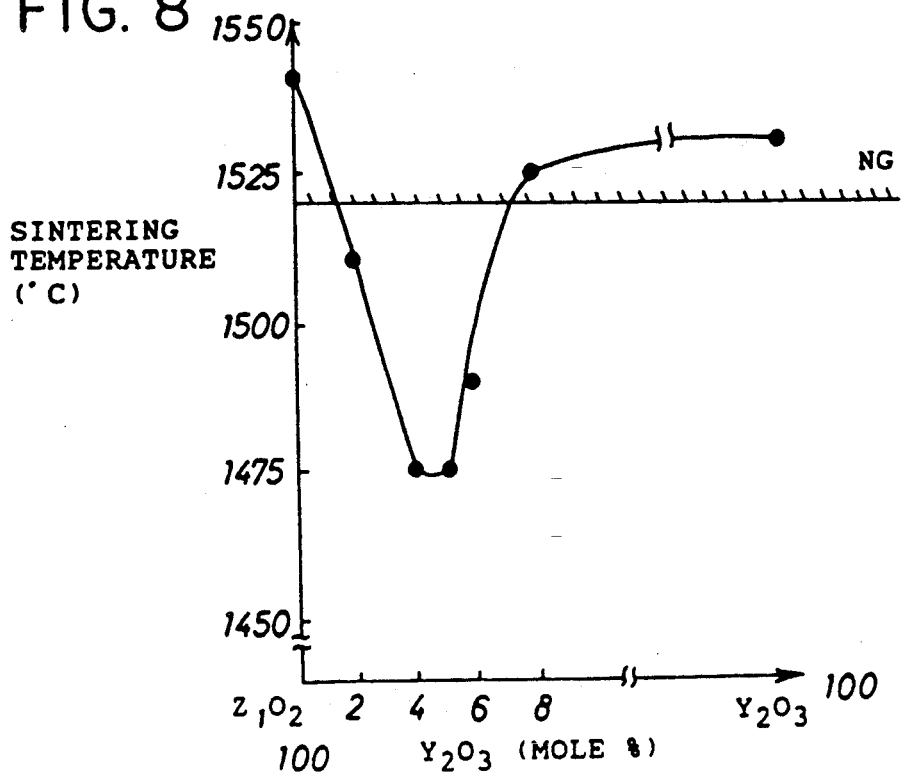

The amount of the solid solution, $Y_2O_3$, in PSZ was varied while the amount of PSZ was fixed to 2% by weight with respect to high purity of alumina. FIG. 8 shows the relationship between the $Y_2O_3$ and the sintering temperature.

As clearly seen in FIG. 8, when the $Y_2O_3$ was in a range of 2 to 6 mole %, the sintering temperature was lower than 1,520° C.; in other words, when it was out of the above range, the sintering temperature became higher than the optimum value.

When the partially stabilized zirconia contained solid solution of $Sc_2O_3$ or lanthanum series metal oxides instead of $Y_2O_3$ within the above range, the heater base was also sufficiently sintered at lower temperatures.

As described above, the alumina sintered body or heater base of the invention is sufficiently sintered at temperatures lower than the optimum value, 1,520° C. Furthermore, segregation and migration of impurities and chipping are effectively prevented and hence the durability of the heater base is highly improved. Use of the alumina sintered body of the invention as a heater base makes the durability of a heater much longer.

What is claimed is:

1. An alumina sintered body having a heater electrode printed and sintered thereon comprising:
   a sintered body of high purity alumina and 2 through 18 percent by weight partially stabilized zirconia, wherein said high purity alumina contains at most 0.1% by weight alkaline metals and/or alkaline earth metals and 1.0% by weight $SiO_2$ said partially stabilized zirconia containing 2 through 6 mole percent of an oxide or oxides selected from the group consisting of $Y_2O_3$, $Sc_2O_3$, and lanthanum series metal oxides.

2. The alumina sintered body of claim 1 wherein:
   said partially stabilized zirconia contains said oxide or oxides co-precipitated therewith.

3. An alumina sintered body having a heater electrode printed and sintered thereon comprising:
   a sintered body of high purity alumina and 2 through 18 percent by weight partially stabilized zirconia, said body having a heater electrode of platinum printed and sintered on a surface thereof and further, wherein said high purity alumina contains at most 0.1% by weight alkaline metals and/or alkaline earth metals and 1.0% by weight $SiO_2$, said partially stabilized zirconia containing 2 through 6 mole percent of an oxide or oxides selected from the group consisting of $Y_2O_3$, $Sc_2O_3$, and lanthanum series metal oxides.

4. The alumina sintered body having a heater electrode printed and sintered thereon of claim 3 wherein:
   said partially stabilized zirconia contains said oxide or oxides co-precipitated therewith.

5. A method for producing an alumina sintered body having a heater electrode formed thereon comprising the steps of:
   a) forming a body of high purity alumina consisting essentially of 2 through 18% by weight of partially stabilized zirconia, wherein said high purity alumina contains at most 0.1% by weight alkaline metals and/or alkaline earth metals and 1.0% by weight $SiO_2$, and wherein said partially stabilized zirconia contains 2 through 6 mole percent solid solution of an oxide stabilizer(s) selected from the group consisting of $Y_2O_3$, $Sc_2O_3$ and the lanthanum series metal oxides;
   b) printing a heater electrode on the body;
   c) simultaneously sintering the body and the heater electrode.

6. The method of claim 5 wherein said step of forming a body includes the step of mixing partially stabilized zirconia in a range of 2 to 18% by weight with high purity alumina.

7. The method of claim 5 wherein said step of simultaneously sintering the body and the heater electrode comprises completely sintering the body and the heater electrode at a temperature lower than 1,520° C.

8. The method of manufacturing an alumina sintered body comprising a base of a heater element for a sensor comprising the steps of:
   a) adding 2% by weight partially stabilized zirconia (PSZ) containing 5.5 mole percent $Y_2O_3$ and a PVB binder to high purity alumina containing 10 ppm or less alkaline metals and/or alkaline earth metals, no more than 14 ppm $SiO_2$, and no more than 3 ppm MgO as impurities;
   b) molding the mixture to form a green sheet;
   c) screen printing a heater electrode mainly of platinum onto a lower face of the green sheet which comprises a heater base;
   d) screen printing a migration preventing pattern mainly composed of platinum onto an upper face of the heater base;
   e) mounting green sheets of laminate, respectively, onto the upper and lower faces of the heater base across a migration preventing pattern and the heater electrode; and,
   f) sintering the heater element thus laminated at a temperature lower than 1,520° C. in a high temperature sintering furnace.

* * * * *